(12) United States Patent  
Masuda (10) Patent No.: US 9,146,396 B2  
(45) Date of Patent: Sep. 29, 2015

(54) OPTICAL SCANNING APPARATUS HAVING LIGHT SOURCE AND HOLDER HOLDING LENS AND IMAGE FORMING APPARATUS INCLUDING OPTICAL SCANNING APPARATUS

(71) Applicants: KABUSHIKI KAISHA TOSHIBA, Minato-ku, Tokyo (JP); TOSHIBA TEC KABUSHIKI KAISHA, Tokyo (JP)

(72) Inventor: Yoshihisa Masuda, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/936,688

(22) Filed: Jul. 8, 2013

(65) Prior Publication Data

US 2014/0092196 A1    Apr. 3, 2014

(30) Foreign Application Priority Data

Sep. 28, 2012   (JP) ................................. 2012-216642

(51) Int. Cl.
| | |
|---|---|
| *B41J 2/435* | (2006.01) |
| *B41J 15/14* | (2006.01) |
| *B41J 27/00* | (2006.01) |
| *G02B 26/12* | (2006.01) |

(52) U.S. Cl.
CPC .................................. *G02B 26/124* (2013.01)

(58) Field of Classification Search
USPC .......... 347/230, 238, 241–245, 256–258, 263
See application file for complete search history.

(56) References Cited

U.S. PATENT DOCUMENTS

| | | | | |
|---|---|---|---|---|
| 5,617,441 | A * | 4/1997 | Nakata et al. ................... | 372/70 |
| 6,982,736 | B2 * | 1/2006 | Okugawa et al. ............. | 347/152 |
| 7,499,205 | B2 * | 3/2009 | Sakai et al. .................... | 347/256 |
| 2001/0012049 | A1 | 8/2001 | Tajima et al. | |
| 2011/0292481 | A1 | 12/2011 | Mihara et al. | |
| 2012/0218614 | A1 | 8/2012 | Kusuda | |

FOREIGN PATENT DOCUMENTS

| | | |
|---|---|---|
| JP | 11-058829 | 3/1999 |
| JP | 2000-111821 | 4/2000 |
| JP | 2011-248230 | 8/2011 |
| JP | 2012-173667 | 9/2012 |

* cited by examiner

*Primary Examiner* — Hai C Pham  
(74) *Attorney, Agent, or Firm* — Amin, Turocy & Watson, LLP (57) ABSTRACT

In accordance with an embodiment, an optical scanning apparatus for exposing a photoconductor includes a light source configured to radiate light, a deflector configured to deflect and scan the light from the light source and guide the light to the photoconductor, a lens configured to guide the light from the light source to the deflector and a holder configured to hold the light source and the lens. The holder includes a first wall portion for holding the light source, a second wall portion for holding the lens, and a pair of third wall portions which are integrally formed with the first and second wall portions to place the light path between the light source and the lens.

4 Claims, 7 Drawing Sheets

OPTICAL SCANNING APPARATUS HAVING LIGHT SOURCE AND HOLDER HOLDING LENS AND IMAGE FORMING APPARATUS INCLUDING OPTICAL SCANNING APPARATUS

CROSS-REFERENCE TO RELATED APPLICATION

This application is based upon and claims the benefit of priority from Japanese Patent Application No. 2012-216642, filed Sep. 28, 2012, the entire contents of which are incorporated herein by reference.

FIELD

Embodiments described herein relate to an optical scanning apparatus and an image forming apparatus provided with the optical scanning apparatus.

BACKGROUND

In an optical scanning apparatus, the light from a light source passes through a lens and then reaches a polygon mirror. The light source and the lens are held by a holder and configured in such a manner that the light-emitting center of the light source substantially coincides with the optical axis of the lens.

DETAILED DESCRIPTION

In accordance with an embodiment, an optical scanning apparatus for exposing a photoconductor includes a light source configured to radiate light, a deflector configured to deflect and scan the light from the light source and guide the light to the photoconductor, a lens configured to guide the light from the light source to the deflector and a holder configured to hold the light source and the lens. The holder includes a first wall portion for holding the light source, a second wall portion for holding the lens, and a pair of third wall portions which are integrally formed with the first and second wall portions to place the light path between the light source and the lens.

Figure 1:
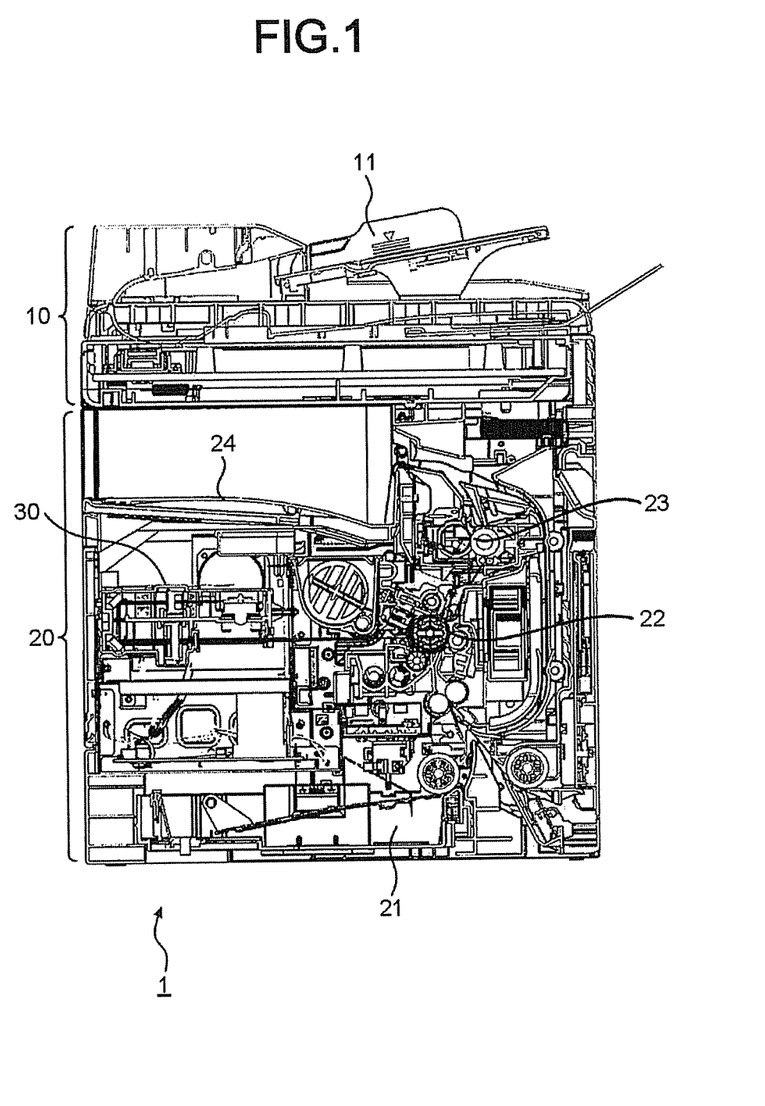
FIG. 1 is a longitudinal section view of an image forming apparatus.

FIG. 1 is a longitudinal section view of an image forming apparatus (MFP: multi Function Peripheral) according to one embodiment. An image forming apparatus 1 comprises an image reading unit 10 and an image forming unit 20. The image reading unit 10 scans and reads the image of an original sheet or book. The image forming unit 20 forms a developer image on a sheet based on the image read by the image reading unit 10 from the original or the image data sent to the image forming apparatus 1 from a peripheral device.

The image reading unit 10 has an automatic document feeder (ADF) 11. The image reading unit 10 reads the image of the original fed by the ADF 11 or the original held on an original table. The image forming unit 20 comprises a paper delivery tray 21, a developing device 22, an optical scanning device 30, a fixer 23 and a paper discharging tray 24.

Actions of the image forming unit 20 are described below.

The sheet stored in the paper delivery tray 21 is conveyed to the developing device 22 by a pickup roller or a conveying roller. The developing device 22 forms a developer image for the sheet conveyed from the paper delivery tray 21. Specifically, the photoconductor included in the developing device 22 is exposed by the light beam from the optical scanning device 30 to form an electrostatic latent image on the photoconductive surface of the photoconductor.

Then, developer is supplied to the photoconductor to develop the electrostatic latent image. A developer image is formed on the photoconductive surface of the photoconductor and then transferred on the sheet conveyed from the paper delivery tray 21. The sheet transferred with the developer image is conveyed to the fixer 23. The fixer 23 heats the sheet to fix the developer image on the sheet. The sheet passing through the fixer 23 is conveyed to and stacked in the paper discharging tray 24.

The structure of the image forming apparatus shown in FIG. 1 is just an example, and the image forming apparatus 1 may have any other structure as long as it enables the image forming apparatus to form a developer image on a sheet.

Figure 2:
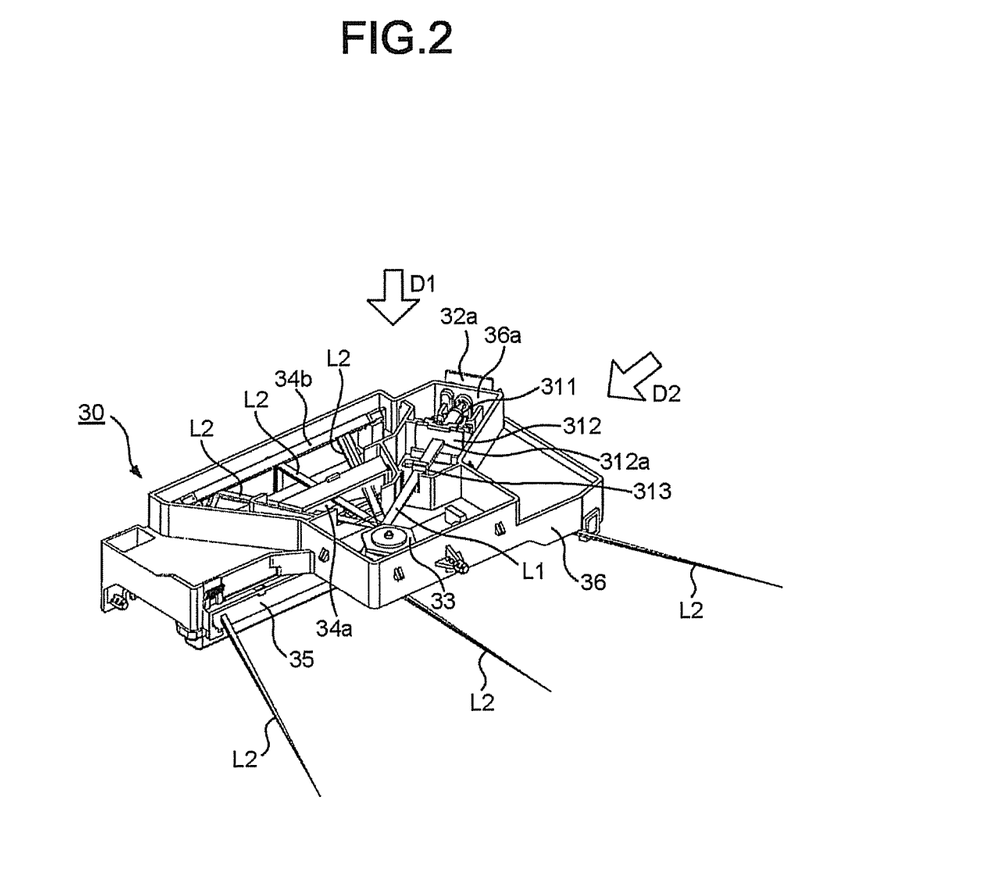
FIG. 2 is a perspective view of an optical scanning apparatus.
Figure 3:
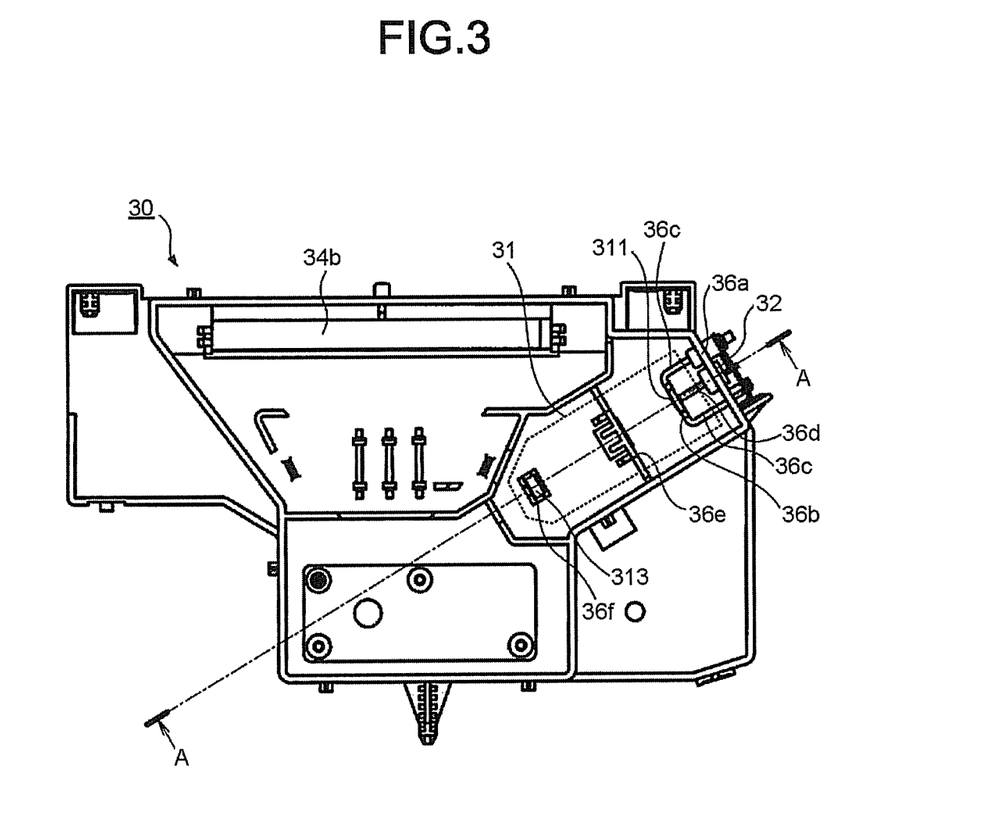
FIG. 3 is a top view of an optical scanning apparatus.
Figure 4:
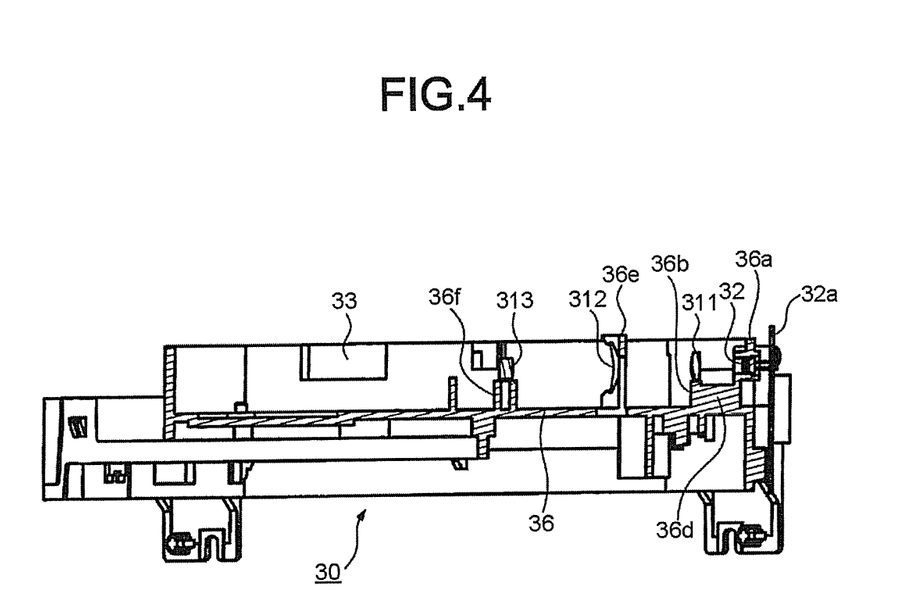
FIG. 4 is the cross-sectional view of the A-A shown in FIG. 3.
Figure 5:
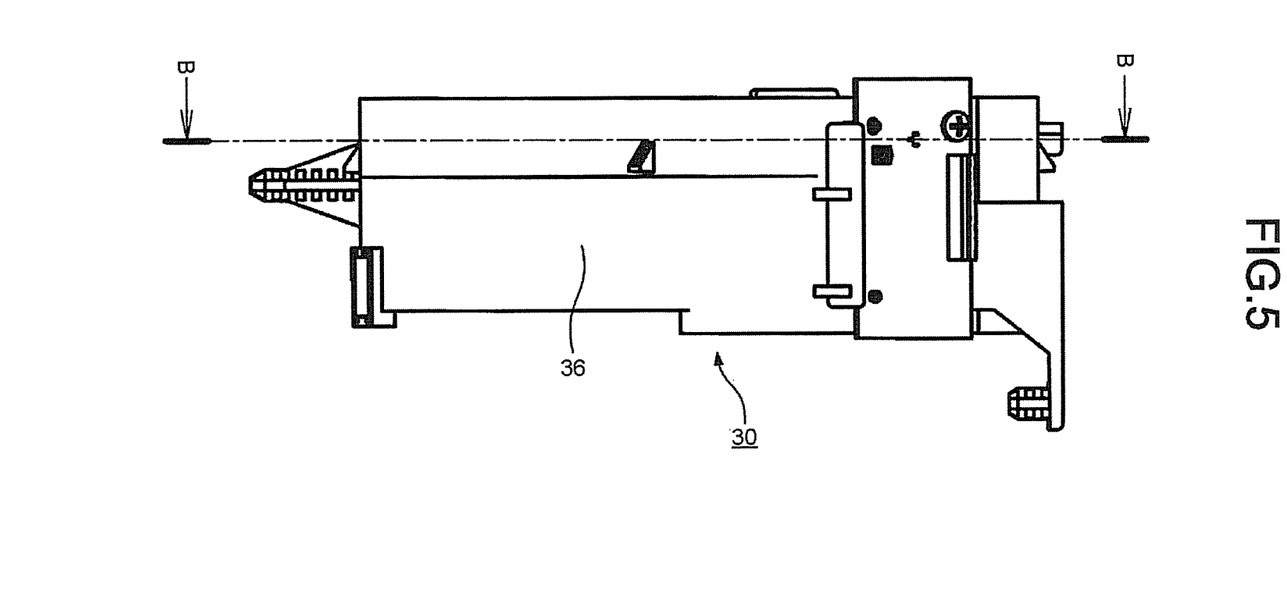
FIG. 5 is a side view of an optical scanning apparatus.
Figure 6:
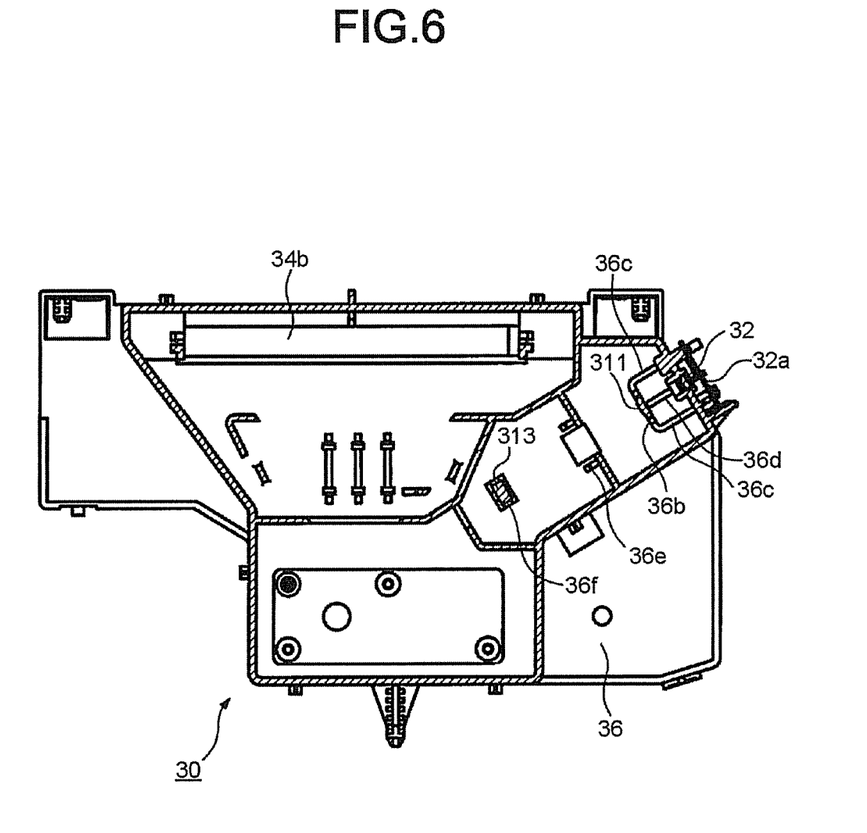
FIG. 6 is the cross-sectional view of the B-B shown in FIG. 5.
Figure 7:
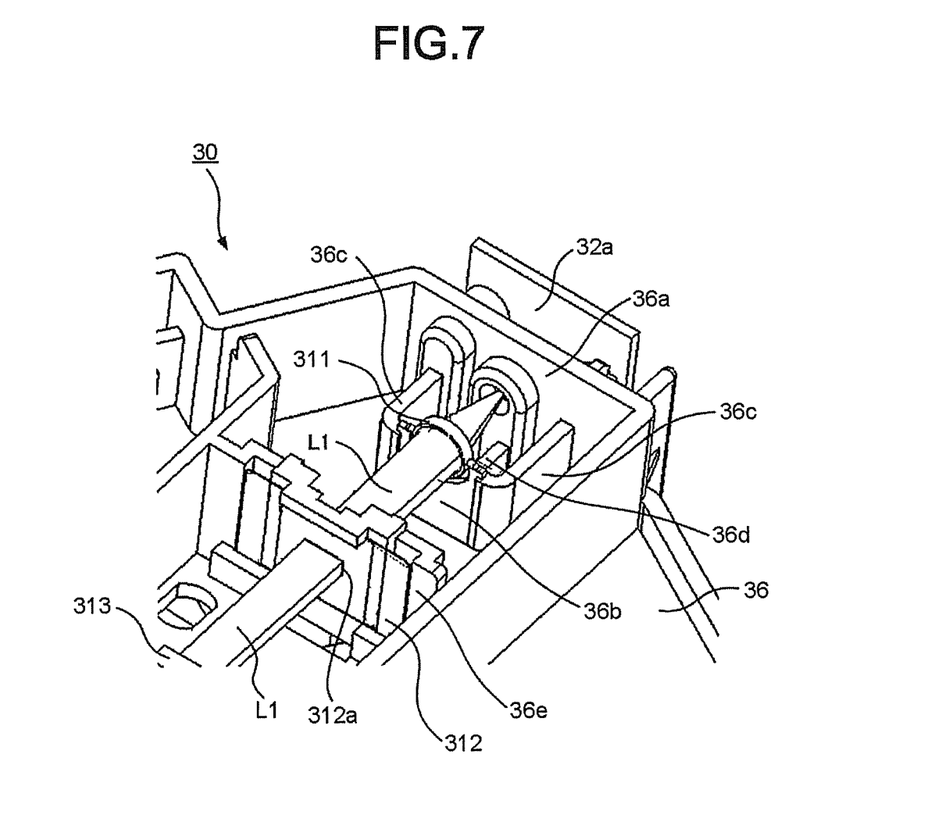
FIG. 7 is a perspective view of a part of an optical scanning apparatus.

Next, the structure of the optical scanning apparatus 30 is described. FIG. 2 is a perspective view of the optical scanning apparatus 30. FIG. 3 is a diagram illustrating the optical scanning apparatus 30 seen from the top (the direction indicated by the arrow D1 shown in FIG. 2). FIG. 4 is the cross-sectional view of the A-A shown in FIG. 3. FIG. 5 is a diagram illustrating the optical scanning apparatus 30 seen from the direction indicated by the arrow D2 shown in FIG. 2. FIG. 6 is the cross-sectional view of the B-B shown in FIG. 5. FIG. 7 is a diagram illustrating the structure of a part of the optical scanning apparatus 30.

The optical system 31 endows the light beam L1 radiated from the light source 32 with a specific characteristic. The light source 32 is fixed on the housing 36 of the optical scanning apparatus 30. Specifically, the light source 32 is pressed into a part of the housing 36 (i.e., the first wall portion 36a).

The light source 32 may be fixed on the housing 36 with a radiator. The heat radiated by the light source 32 accompanied with the light radiation of the light source 32 can be dissipated to the outside by the radiator, thereby preventing the rise in the temperature of the light source 32.

The housing 36 can be made from, for example, resin. The light source 32, for example, may be a laser diode and is mounted on a base plate 32a which is used to drive the light source 32.

After passing through the optical system 31, the light beam L1 radiated from the light source 32 reaches a polygon mirror 33. The optical system 31 comprises a collimator lens 311, an aperture plate 312 and a cylindrical lens 313. The light beam L1 radiated from the light source 32 enters the collimator lens 311. The light beam L1 radiated from the light source 32 is easily diverged, thus, the collimator lens 311 is provided to convert the divergent light of the light source 32 into parallel light.

As shown in FIG. 7, the second wall portion 36b holds the collimator lens 311. The second wall portion 36b is configured on a surface orthogonal to the optical axis of the collimator lens 311 and integrally formed with the housing 36.

The upper end of the second wall portion 36b is formed in a shape matched with the outer edge of the collimator lens 311 and it has a curvature. The second wall portion 36b holds the collimator lens 311 by positioning the center of the collimator lens 311 on the optical axis (designed value) of the optical system 31.

With the use of, for example, adhesive, the collimator lens 311 may be fixed on the second wall portion 36b. Any proper way that can fix the collimator lens 311 on the second wall portion 36b can be used. For example, a claw may be set on the second wall portion 36b to place the collimator lens 311. In addition, the second wall portion 36b may hold a part of or the whole outer edge of the collimator lens 311.

The light beam L1 passing through the collimator lens 311 passes through the aperture plate 312, which may be formed by die-cutting a plate. As shown in FIG. 7, the aperture plate 312 has a hole 312a through which the light beam L1 from the collimator lens 311 passes.

An aperture holder 36e holds the aperture plate 312 in such a manner that the center of the hole 312a is located on the optical axis. The aperture plate 312 blocks the part of the light beam L1 from the collimator lens 311 which does not face the hole 312a.

The light beam L1 passing through the hole 312a of the aperture plate 312 enters the cylindrical lens 313, which concentrates the light beam L1 from the aperture plate 312 in a vertical scanning direction (the vertical direction shown in FIG. 4).

A lens holder 36f holds the cylindrical lens 313 by positioning the center of the collimator lens 311 on the optical axis (designed value) of the optical system 31. The lens holder 36f is integrally formed with the housing 36 in one embodiment, however, the lens holder 36f may consist of other components different from the housing 36.

The light beam L1 passing through the optical system 31 (cylindrical lens 313) reaches the polygon mirror 33. The polygon mirror 33 is rotationally fixed on the housing 36 to reflect the light beam L1 from the optical system 31 towards a scanning lens 34. The polygon mirror 33 deflects the light beam L1 from the optical system 31 in the horizontal scanning direction by the rotation.

L1 represents a light beam from the light source 32 to the polygon mirror 33, in other words, a light beam that is not deflected. L2 represents a light beam reflected by the polygon mirror 33, in other words, a light beam that is deflected. The scanning lens 34a extends in the horizontal scanning direction so that the reflected light from the polygon mirror 33 is concentrated in the vertical scanning direction (a direction orthogonal to the horizontal scanning direction).

The reflecting mirror 34b reflects the light beam L2 passing through the scanning lens 34. The light beam L2 reflected by the reflecting mirror 34b enters the photoconductor of the developing device 22 through a dustproof glass 35 which is fixed on the housing 36 to prevent dust and other foreign matters from entering the optical scanning apparatus 30.

A pair of third wall portions 36c is configured between the first wall portion 36a and the second wall portion 36b, located at positions deflected from the light path between the light source 32 and the collimator lens 311, and integrally formed with the housing 36. By configuring the third wall portions 36c at the positions deflected from the light path, the light beam L1 radiated from the light source 32 is prevented from being blocked to the collimator lens 311.

The third wall portions 36c extend from the first wall portion 36a towards the second wall portion 36b. The third wall portions 36c may be configured along the direction of the optical axis of the light radiated from the light source 32 or configured slantwise with respect to the direction of the optical axis.

One end of the third wall portions 36c is integrally formed with the first wall portion 36a, and the other end of the third wall portions 36c is integrally formed with the second wall portion 36b. The first wall portion 36a and the second wall portion 36b are connected with each other through the pair of third wall portions 36c, thereby preventing the deformation of the first wall portion 36a and the second wall portion 36b.

As the plane where the third wall portions 36c exist is orthogonal to the plane where the first wall portion 36a exists, the deformation of the first wall portion 36a can be prevented through the third wall portions 36c. For example, the third wall portion 36c can prevent the inclination of the first wall portion 36a.

Here, as the plane where the third wall portions 36c exist is orthogonal to the plane where the second wall portion 36b exists, the deformation of the second wall portion 36a is prevented through the third wall portion 36c. For example, the third wall portion 36c can prevent the inclination of the second wall portion 36b.

As stated above, by forming the first wall portion 36a, the second wall portion 36b and the third wall portions 36c integrally, the rigidity of the first wall portion 36a, the second wall portion 36b and the third wall portions 36c can be increased.

If the deformations of the first wall portion 36a and the second wall portion 36b are prevented, the deviation in the position relationship between the light source 32 held by the first wall portion 36a and the collimator lens 311 held by the second wall portion 36b is prevented.

For example, if the first wall portion 36a is inclined, then the light is radiated from the light source 32 from a changed direction, the light radiated from the light source 32 deviates from the center of the collimator lens 311. Further, if the second wall portion 36b is inclined, then the orientation of the collimator lens 311 is changed, and the light from the light source 32 consequentially deviates from the center of the collimator lens 311.

In one embodiment, for example, if the inclination of the first wall portion 36a and the second wall portion 36b can be prevented, the light-emitting center of the light source 32 and the optical axis of the collimator lens 311 are unified easily, and the optical system 31 can obtain a desired optical characteristic easily.

In one embodiment, the pair of third wall portions 36c is configured the same distance away from the optical axis of the optical system 31. However, as long as the third wall portion 36c is integrally formed with the first wall portion 36a and the second wall portion 36b, the distances between the pair of third wall portions 36c and the optical axis of the optical system 31 may also be different.

A fourth wall portion 36d is configured between the pair of third wall portions 36c. The fourth wall portion 36d extends from the first wall portion 36a towards the second wall portion 36b and is integrally formed with the first wall portion 36a and the second wall portion 36b. Further, the fourth wall portion 36d is integrally formed with the housing 36.

The fourth wall portion 36d is configured at a position deflected from the light path between the light source 32 and the collimator lens 311. By configuring the fourth wall portion 36d at the position deflected from the light path, the light radiated from the light source 32 is prevented from being blocked to the collimator lens 311.

The setting of the fourth wall portion 36d makes it easy to prevent the deformation of the first wall portion 36a and the second wall portion 36b. That is, in one embodiment, the deformation of the first wall portion 36a and the second wall portion 36b is prevented by the third wall portions 36c and the fourth wall portion 36d. However, the fourth wall portion 36d may be omitted. That is, by using at least one pair of third wall portions 36c, the deformation of the first wall portion 36a and the second wall portion 36b is prevented.

In one embodiment, the wall portions 36a-36d are integrally formed with the housing 36. They may not be integrally formed with the housing 36. Specifically, a component (the called holder) provided with the wall portions 36a-36d may be prepared in advance and fixed on the housing 36. At least any component (the called holder) provided with the wall portions 36a-36c is used, as long as it can hold the light source 32 and the collimator lens 311.

In one embodiment, the collimator lens 311 is directly fixed on the second wall portion 36b. However, the collimator lens 311 may be accommodated in a lens cylinder which is fixed on the second wall portion 36b.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An optical scanning apparatus exposing a photoconductor, comprising:
    a light source configured to radiate light;
    a deflector configured to deflect and scan the light from the light source and guide the light to the photoconductor;
    a lens configured to guide the light from the light source to the deflector; and
    a housing configured to constitute the exterior of the optical scanning apparatus, a part of the housing including a first wall portion holding the light source, a second wall portion holding the lens, and a pair of third wall portions which are integrally formed with the first and second wall portions to place the light path between the light source and the lens, the upper end of the second wall being formed in a shape matched with the outer edge of the lens, the lens being fixed to the upper end of the second wall with an adhesive, the outer edge of the lens including a first area in contact with the upper end of the second wall and a second area not in contact with the upper end of the second wall that is exposed outside.

2. The optical scanning apparatus according to claim 1, wherein
    the housing includes a fourth wall portion which is located in a place separated from the light path and integrally formed with the first wall portion and the second wall portion.

3. The optical scanning apparatus according to claim 1, wherein
    the lens converts the light radiated from the light source into substantially parallel light.

4. An image forming apparatus including the optical scanning apparatus according to claim 1, the image forming apparatus comprising:
    a developing device configured to receive the light from the optical scanning apparatus to form an electrostatic latent image and transfer a developer image corresponding to the electrostatic latent image onto a sheet; and
    a fixer configured to heat the sheet transferred with the developer image to fix the developer image on the sheet.

* * * * *